J. A. WICKE.
WATER LEVEL AND TEMPERATURE INDICATOR FOR AUTOMOBILE RADIATORS.
APPLICATION FILED JUNE 26, 1918.
1,330,457.
Patented Feb. 10, 1920.
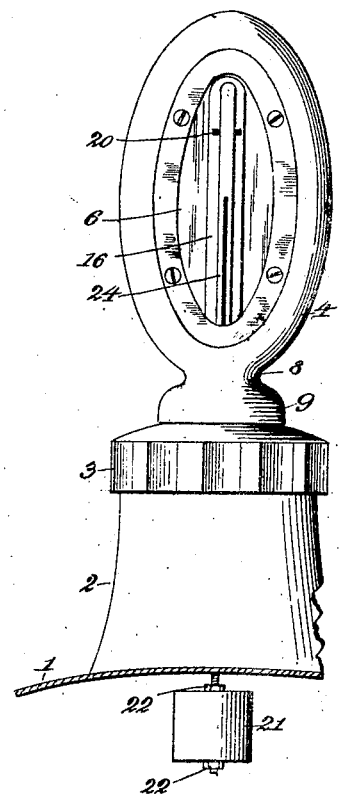
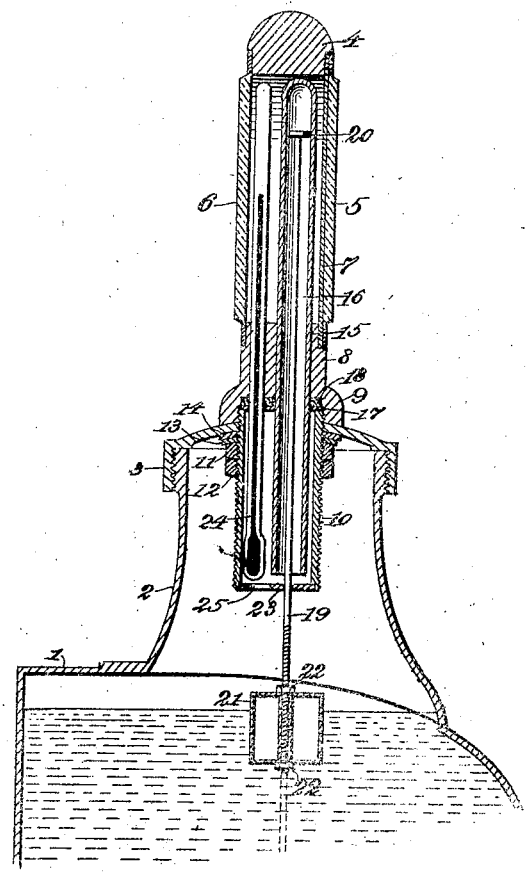
Inventor
Joseph A. Wicke
By J. M. St. John
Atty.

UNITED STATES PATENT OFFICE.

JOSEPH A. WICKE, OF CEDAR RAPIDS, IOWA.

WATER-LEVEL AND TEMPERATURE INDICATOR FOR AUTOMOBILE-RADIATORS.

1,330,457.  Specification of Letters Patent.  Patented Feb. 10, 1920.

Application filed June 26, 1918. Serial No. 241,964.

*To all whom it may concern:*

Be it known that I, JOSEPH A. WICKE, a citizen of the United States, residing at Cedar Rapids, in the county of Linn and State of Iowa, have invented certain new and useful Improvements in Water-Level and Temperature Indicators for Automobile-Radiators; and I do hereby declare the following to be a full, clear, and exact description of the invention, such as will enable others skilled in the art to which it appertains to make and use the same.

This invention relates to automobile radiators, the object of the invention being to provide means whereby the water level in the radiator, and also the temperature of the water, may be determined by the driver from his position at the wheel.

The efficiency and safety of an internal explosion engine, of the water-cooled type, depends very largely upon the amount of water in the radiator, its flow, and its temperature. When the latter rises so as to produce steam there is danger of overheating the engine. The danger in this case is less, however, than in the case of a lower temperature if the supply of water be low. Because it is somewhat inconvenient to ascertain the water-level, ordinarily, it often happens that the water sinks too low in the radiator, and sometimes with very serious consequences. This invention makes it possible for the operator of the automobile to know at a glance the amount, as well as the temperature of the radiator water, and thus avoid inconvenience, and possible injury to the engine.

The nature of the invention is fully disclosed in the description and claim following, reference being had to the accompanying drawing, in which:—

Figure 1 is a view of the water-level and temperature indicator, as seen from the driver's seat. Fig. 2 is a central transverse section of the same.

In the drawing, the numeral 1 denotes the upper portion of an automobile radiator, commonly known as the radiator tank. To this is connected the filling nozzle 2, provided with a cap 3. These are of familiar construction, and need no particular description. The indicator is described as follows:

A metal frame 4, preferably elliptical in form, is provided with front and rear glasses 5 and 6. Behind the former is a backing 7, which may carry the owner's name, the number of the car, or any other desired data. The latter glass opens directly to the interior of the frame so that the contents thereof are visible from that side. The frame has a neck 8 terminating in an expanded base 9, cupped on the under side, so as to take the curvature of the top of the nozzle cap. From the base a shank 10 extends downwardly, and serves in part as a means for securing the frame to the cap. In practice the shank is a tube of brass, or the like non-corrosive material, and screwed into the base of the frame, which may be of cast iron. On the screw-threaded shank a nut 11, set-nut 12, washer 13 and gasket 14 serve to fasten the frame in place on the cap, with a steam-tight joint.

The neck is pierced at 15 to receive a glass tube 16, held in position, with a steam-tight joint, by a washer 17, cork gasket 18, and the shank above described. Extending into this glass tube from the open bottom is a stem 19 provided with a suitable head 20 of slightly less diameter than the bore of the inclosing glass tube and preferably made black so as to render it distinctly visible. At the lower end of the stem, which depends into the water of the radiator tank, is a float 21, held adjustably in place by nuts 22 on the threaded stem. The stem passes through a hole in a disk 23 attached to the lower end of the tubular shank, and this and the tube 16 serve as guides to hold the float and its connections in proper position. In practice the stem is made long, as indicated by the dotted extension, since its necessary length will vary with different automobiles, but the extra length and long thread permit a proper adjustment of the float, when the extra stem may be cut off.

It will be evident that when the water sinks in the radiator tank the few inches necessary to call for replenishment, the float will have settled until the stem-head is at the bottom of the frame, or out of sight. The operator is thus warned at a glance, and may give the cooling system attention before any trouble arises.

The same frame that carries the water-level indicator is made to serve for a thermometer 24, mounted in the same way as the tube 16. The thermometer glass being of much smaller diameter than the tube 16, the former may be set directly in front of the latter, from the point of view of the operator, who may thus take both readings at a glance, as shown in Fig. 1, the water-level disk showing each side of the thermometer tube. A hole at 25 gives the air or steam in the radiator free access to the thermometer bulb, so as to correctly register the heat of the radiator. But while the thermometer is regarded as a valuable adjunct to the water-level indicator, it is not indispensable, the height of the water being more important than its temperature, as above mentioned. It is contemplated, therefore, that the latter may be used independently of the former, or both in conjunction, as desired.

Having thus described my invention, I claim:

Combined with the cap of an automobile radiator, a frame having a transparent side exposed to the view of the operator, a tubular shank for said frame, means for attaching the frame to the radiator cap, a transparent tube vertically set in said frame, an indicating disk slidable inside of and guided by said tube, a stem depending from said disk, a guide therefor in said shank, and a thermometer set in said frame between the tubular guide and the transparent side of the frame, its bulb being inclosed and protected by said tubular shank.

In testimony whereof I affix my signature in presence of two witnesses.

JOSEPH A. WICKE.

Witnesses:
 A. T. COOPER,
 J. M. ST. JOHN.